June 24, 1969 J. C. GREESON, JR., ET AL 3,452,217

COMPENSATING RESET CIRCUIT

Filed Dec. 27, 1965 Sheet 1 of 2

INVENTORS
JAMES C. GREESON JR.
JAMES J. KENNEDY
BY John C Black
ATTORNEY

United States Patent Office 3,452,217

Patented June 24, 1969

3,452,217

COMPENSATING RESET CIRCUIT

James C. Greeson, Jr., Endwell, N.Y., and James J. Kennedy, Rochester, Minn., assignors to International Business Machines Corporation, Armonk, N.Y., a corporation of New York Filed Dec. 27, 1965, Ser. No. 516,573
Int. Cl. G06g 7/12
U.S. Cl. 307—229 8 Claims This application is directed to a digitally controlled analog circuit in which means are provided for selectively causing the output of the analog circuit to be alternatively at a selected reference potential or at a potential which is a function of one or more input signals.

Figure 1:
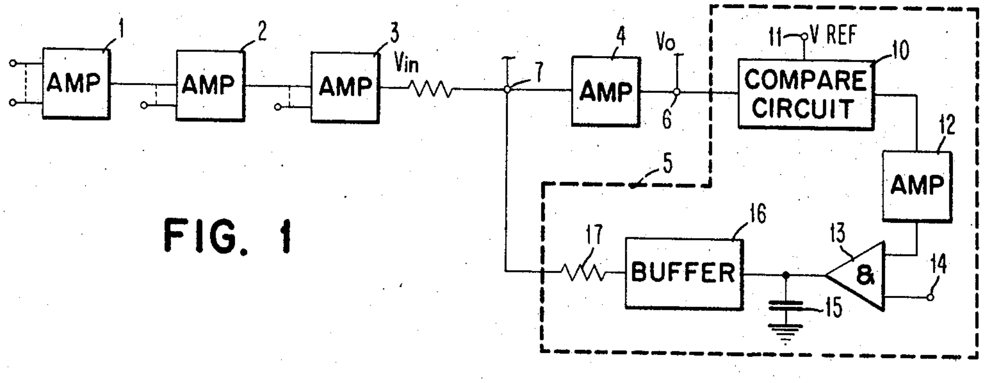

In hybrid computers, the output of an operational amplifier or a series of cascade-connected amplifiers is periodically set at a fixed reference potential, for example, ground potential or some reference potential which has been determined by previous operation of the apparatus.

In such hybrid apparatus, the operation is usually in the form of a series of analog compute cycles spaced from each other in time and digitally controlled. Frequently, the time interval between analog compute cycles is utilized to reset the analog circuits. One typical application lies in the area of optical character recognition apparatus.

For reliable operation of the apparatus, the reference potential must exist at the output of the amplifier or amplifiers, irrespective of the offset error voltages which are produced within the amplifier or amplifiers and irrespective of the level of the input signals present at the initiation of a compute cycle.

In this environment, the amplifier output error necessitates the solution of two individual problems. The first problem, amplifier offset error and drift, has in known applications been solved by providing relatively expensive operational amplifiers. The offset error and drift is minimized in the more expensive operational amplifiers by the utilization of controlled environment or chopper stabilization.

However, this solution to the offset error and drift problem does not provide a solution to the second problem, i.e. that of suppressing the initial values of the input signals at the beginning of a compute cycle if they are in error. Consequently, reset means are required for each of the input signals to the amplifier or amplifiers.

It is therefore a primary object of the present invention to provide a relatively inexpensive circuit means which compensates for the accumulated drift and offset errors in each of the amplifiers and also compensates for the initial error in the input signal levels at the initiation of an analog compute cycle.

This simplified circuit arrangement permits the use of inexpensive operational amplifiers (e.g. $3 per amplifier vs. approximately $45 per amplifier). Also as a result of the use of this simplified arrangement, it is no longer necessary to individually reset the analog circuits which produce the input signals to the chain of amplifiers.

This object is achieved in a preferred embodiment of the invention by connecting a compensating circuit to the output of the final amplifier in the chain, which circuit when rendered effective continuously feeds back into the input of said final amplifier an additional input signal which causes the output voltage of the final amplifier to be maintained at the desired reference level. This circuit includes a means for comparing the output voltage of the final amplifier with the reference voltage and producing an output signal which is a function of the difference. A digitally controlled gate is provided for connecting the output of the compare circuit to a storage capacitor in such a manner as to produce across the capacitor a voltage which is a desired function of the output current of the compare circuit. The voltage across the capacitor is then applied to the input of the final amplifier in the chain by way of a buffer with a high input impedance and a series resistance.

The compare circuit, the gate, the capacitor, the buffer, an amplifier and the series resistance are proportioned so as to produce a correction signal at the input to the amplifier which cancels the drift and offset error signal, if any, within the amplifier and any signal appearing at the signal path input to the final amplifier. This latter signal, if any, includes the drift and offset error signals of the preceding operational amplifier stages and any input signals to the chain of amplifiers. Consequently, the voltage appearing at the output of the final amplifier stage precisely equals the reference voltage.

It is therefore a more specific object of the present invention to provide in an operational amplifier means for compensating for the drift and/or offset error within the amplifier characterized by means producing an output signal which is a function of the difference between the amplifier output voltage and a preselected reference voltage, selectively operated means for producing a voltage across a storage capacitor which is a function of said signal and means for applying a signal to the input of the amplifier under the control of the capacitor voltage to compensate for the error.

It is another object of the present invention to provide the combination set forth in the immediately preceding object which is further characterized by the fact that the correction circuit also compensates for any initial input signal to the operational amplifier which is at a level other than some predetermined reference.

The foregoing and other objects, features and advantages of the invention will be apparent from the following more particular description of preferred embodiments of the invention, as illustrated in the accompanying drawings.

Figure 2:
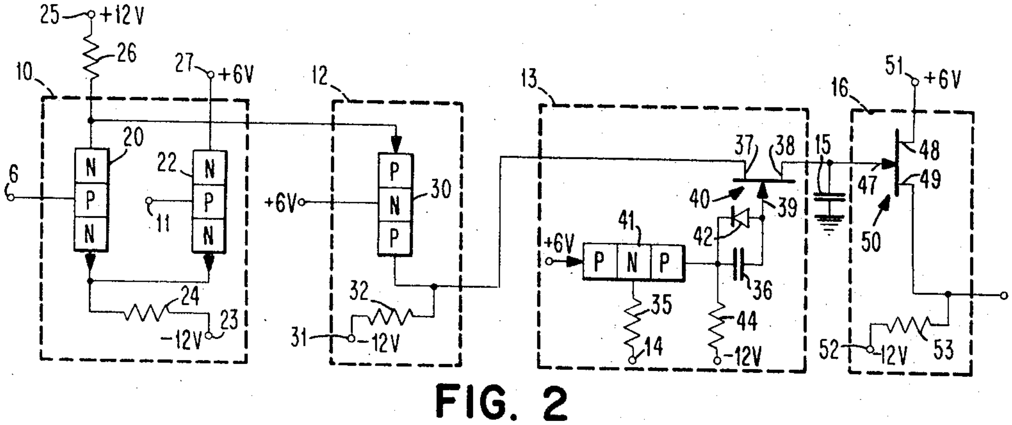
Figure 3:
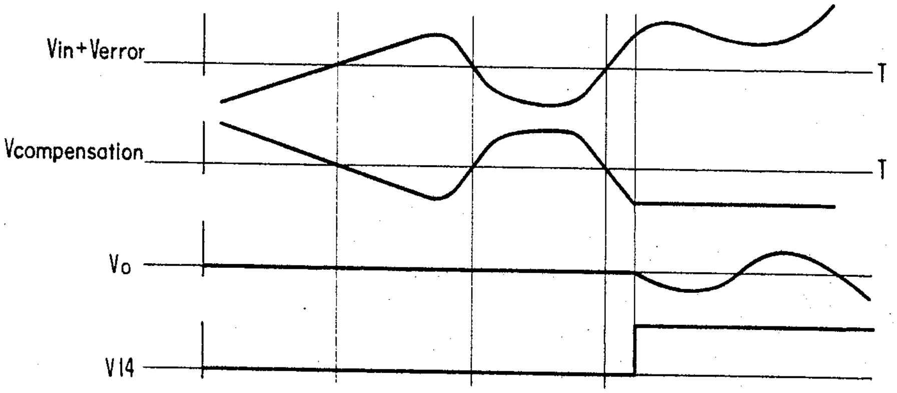
Figure 4:
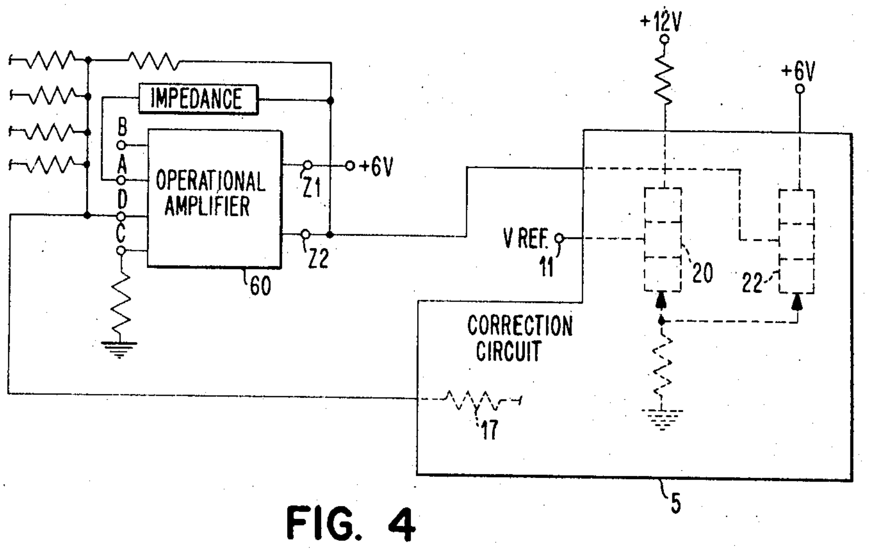
Figure 5:
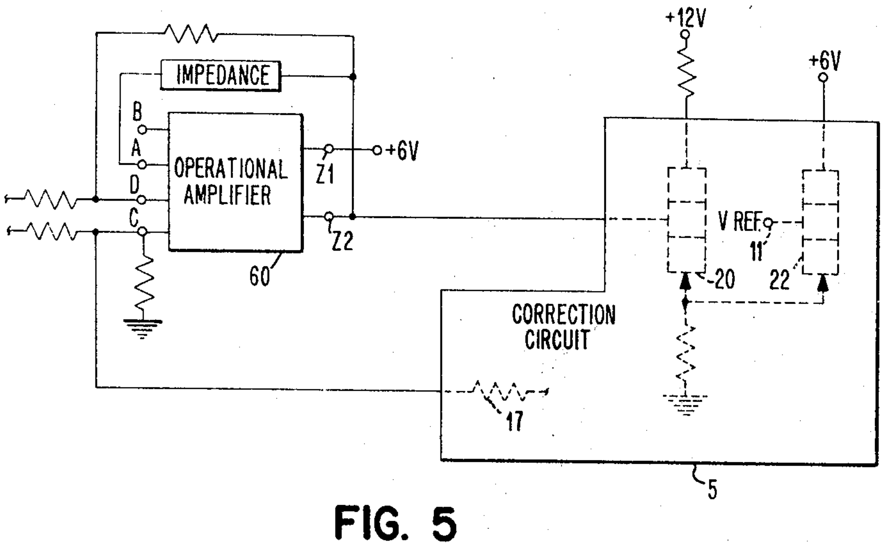

In the drawings:

FIG. 1 diagrammatically illustrates a preferred embodiment of the improved compensation circuit;

FIG. 2 is a fragmentary, schematic diagram of a preferred form of the compensation circuit of FIG. 1;

FIG. 3 includes waveforms at various points in the circuits of FIGS. 1 and 2 to more clearly illustrate the operation of the embodiment of FIG. 1; and FIGS. 4 and 5 diagrammatically illustrate other embodiments of the present invention.

FIG. 1 shows an embodiment comprising a plurality of cascade-connected operational amplifiers 1, 2, 3 and 4, with one form of correction circuit 5 connected between the output terminal 6 and the input terminal 7 of the final amplifier 4 in the chain.

During normal operation of the amplifiers 1–4, the compensating circuit 5 applies a fixed signal to the terminal 7 which compensates for any errors which existed at the initiation of a compute cycle; and the voltage at the output terminal 6 is in an accurate function of the various input signals to the amplifiers.

The compensation circuit 5 includes a compare circuit 10 which has a first input connected to the output terminal 6 of the amplifier 4 and a second input connected to a reference potential terminal 11. The circuit 10 compares the output voltage at the terminal 6 with the reference voltage at the terminal 11 and applies a current to an amplifier 12 which is a function of the difference between the output voltage and the reference voltage. A gate 13 has a first input connected to the output of the amplifier 12 and a second input terminal 14 which is coupled to controlling digital circuits (not shown). When an appropriate digital signal is applied to the terminal 14, the gate 13 is closed to connect the output of the amplifier 12 to a storage capacitor 15. With the gate 13 closed, the capacitor 15 is charged to a potential which is a function of the output of the amplifier 12. The voltage across the capacitor is applied to the input terminal 7 of the amplifier 4 by way of a buffer 16, which has a high input impedance, and a series resistor 17.

With the gate 13 closed to charge the capacitor 15 in accordance with the output voltage of the amplifier 12, a current will be produced through the resistor 17 into the input terminal 7 which has a value which will produce at the output terminal 6 a voltage which is equal to the reference voltage at the terminal 11.

When the gate 13 is opened at the beginning of a compute cycle to disconnect the capacitor 15 from the amplifier 12, the capacitor voltage remains at its last achieved value to assure error compensation during the compute cycle.

It will be appreciated that the level of the reference potential at the terminal 11 may, where desired, be set at selected values under program control in known manner or be continuously varying.

It will be further appreciated that the gate terminal 14 could be manually controlled by appropriate switch means.

FIG. 2 illustrates one specific embodiment of the compensation circuit 5. The compare circuit 10 includes a pair of transistors 20 and 22 operated as a differential amplifier with their emitter electrodes connected to a negative supply terminal 23 by way of a common resistor 24. The collector electrode of the transistor 20 is connected to a positive supply terminal 25 by way of a resistor 26. The collector electrode of the transistor 22 is connected to a positive supply terminal 27. The base electrodes of the transistors 20 and 22 are connected respectively to the terminals 6 and 11 of FIG. 1 to produce at the collector electrode of the transistor 20 a signal which is an inverse function of the difference between the output voltage at the junction 6 and the reference potential at the terminal 11.

The amplifier 12 comprises a common base transistor amplifier 30 having its emitter electrode connected to the collector electrode of the transistor 20 and having its collector electrode connected to a negative supply terminal 31 by way of a resistor 32. The amplifier 12 produces an output signal which is a direct function of the output signal of the compare circuit 10 and applies it to the gate 13.

The gate 13 comprises a first junction type field effect transistor 40 having its source and drain terminals 37 and 38 connected between the collector electrode of the transistor 30 and one plate of the storage capacitor 15. The other plate of the capacitor 15 is connected to ground potential. The control gate 39 of the transistor 40 is connected to a collector electrode of a common emitter transistor 41 by way of a speed-up capacitor 36 and a diode 42. The collector electrode of the transistor 41 is connected to a negative supply terminal 43 by way of a resistor 44, and its emitter electrode is connected to a positive supply terminal 45. The base electrode of the transistor 41 is connected to the logical input terminal 14 by way of a resistor 35.

When a signal is applied to the terminal 14 to turn the transistor 41 on, the positive potential at its emitter electrode is applied to the diode 42. The diode reverse biases to leave the control gate "floating." The field effect transistor 40 enters its low impedance region to connect the capacitor 15 to the collector electrode of the transistor amplifier 30 to continuously charge the capacitor 15 in accordance with the difference between the output voltage at the terminal 6 and the reference potential at the terminal 11.

This continuously varying potential on the capacitor 15 is applied to the control gate 47 of a junction type field effect transistor 50 in the buffer 16. The transistor 50 has its drain and source terminals 48 and 49 connected between positive and negative supply terminals 51 and 52 by way of a resistor 53. The transistor 50 is operated as a non-inverting, high input impedance buffer amplifier. The source terminal 49 is connected to the resistor 17 (FIG. 1).

It is assumed for purposes of illustration that the amplifier 4 is operated in the potentiometric mode, i.e. the output voltage is non-inverted with respect to the input signal. Since the output of the circuit 5 in FIG. 2 is inverted with respect to the input signal at terminal 6, it has the requisite polarity for assuring error compensation. If the amplifier 4 is of the signal inverting type, the terminals 6 and 11 must be connected respectively to the base electrodes of the transistors 22 and 20 to obtain the proper feedback polarity.

During each compute cycle, a positive signal is applied to the input terminal 14 to turn the transistor 41 off, the negative potential at the control gate 39 turning the transistor 40 off to provide a very high isolating impedance between the amplifier 12 and the storage capacitor 15. Due to the very high isolation impedance of the transistor 40 and to the very high input impedance of the transistor 50, the charge across the capacitor 15 will remain essentially constant during the compute cycle. This will cause a fixed compensating input signal into the amplifier 4 by way of the capacitor 15, the transistor 50 and the resistor 17.

This mode of operation is more clearly illustrated by the waveforms of FIG. 3. With the signal at the terminal 14 at its relatively negative level, and assuming that the input and internal error signal is varying as illustrated about the threshold level T at which it should be fixed, the compensating circuit 5 will apply an equal and opposite compensating signal to the resistor 17 which will cause the output voltage ($V_o$) to remain at the reference level.

When it is desired to start an analog compute cycle, the more positive voltage level (V14) applied to the input terminal 14, is raised to its positive level to isolate the capacitor 15 and the amplifier 12; and the output voltage $V_o$ varies thereafter as an inverse function of the input voltage $V_{in}$. During this compute cycle, the compensation voltage remains constant at the level which existed when the compute cycle was initiated.

Typical values for the components in FIG. 2 are set forth below; it will be appreciated that they are given by way of example and that other suitable values may be used.

| Resistors: | Values in ohms |
|---|---|
| 24 | 6000 |
| 26, 53 | 3000 |
| 32, 44 | 12000 |
| 35 | 10000 |

| Capacitors: | | Values |
|---|---|---|
| 36 | picofarads | 100 |
| 15 | microfarads | .22 |

The amplifiers 1–4 may be of any known type. However, the correction circuit 5 is particularly useful with low cost operational amplifiers, for example, such as that shown in FIG. 1 of co-pending United States patent application of James C. Greeson, Jr. Ser. No. 491,962, entitled "Monolithically Fabricated Operational Amplifier Device With Self Drive," filed Oct. 1, 1965 and assigned to the assignee of the present application.

Said co-pending application is hereby incorporated herein by reference as if it were set forth in its entirety.

The improved operational amplifier of said co-pending application may be used in either the current summing or the differential amplifying mode, as illustrated in said co-pending application in FIGS. 3 and 2 respectively, which figures are reproduced herein in FIGS. 4 and 5 respectively with the same input-output reference letters being used.

When the correction circuit 5 of the present application is used with said improved operational amplifier 60 in its current summing mode as shown in FIG. 4 herein, the resistor 17 is connected to the input terminal D of the amplifier; and the output terminal Z2 of the amplifier is connected to the base electrode of the transistor 22 (FIG. 2). The reference potential terminal 11 is connected to the base electrode of the transistor 20. These connections between the amplifier and the correction circuit assure the proper feedback signal phase to achieve the desired correction.

When the circuit 5 is used with the amplifier 60 in its differential amplifying mode, FIG. 5, the resistor 17 is connected to the input terminal C; the output terminal Z2 is connected to the base electrode of the transistor 20; and the reference potential is connected to the base electrode of the transistor 22 to assure the proper feedback signal phase.

In each embodiment, the correction signal applied by the circuit 5 to the amplifier is of a polarity which causes the output voltage to be maintained at the reference level between compute cycles.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In apparatus of the type in which an analog circuit includes a plurality of cascade-connected operational amplifiers operated under the control of digital signals to execute compute cycles;

each amplifier being uncompensated for drift and offset errors, each having uninterrupted negative feedback means and said amplifiers coupling their output signals to succeeding ones thereof both during and between compute cycles;

the combination with the amplifiers of an error correction circuit connected to the last amplifier in the plurality and effective between compute cycles for maintaining the output voltage of the last amplifier at a preselected level, irrespective of the input signal levels to all of the amplifiers and irrespective of the offset and drift errors in all said amplifiers comprising input signal sources, means coupling signals from each of said sources to respective ones of said amplifiers both during and between compute cycles, a source of reference voltage set to said preselected level;

a compare circuit producing an output signal which is a function of the difference between said last amplifier output voltage and said reference voltage;

a reactive storage element;

gate means controlled by the digital signals between compute cycles to couple the output of the compare circuit to the storage element for producing across the storage element a voltage which is a function of said difference output signal and controlled during each compute cycle to decouple the output of the compare circuit from the storage element causing the storage element to retain the voltage level which exists at the beginning of the compute cycle; and buffer means controlled by the storage element for applying to the amplifier a correction signal which compensates for input signal errors and offset and drift errors.

2. The combination set forth in claim 1 wherein the compare circuit includes a differential amplifier having one input connected to the source of reference voltage and a second input connected to the output of said last operational amplifier.

3. The combination set forth in claim 2 wherein the storage element comprises a capacitor.

4. The combination set forth in claim 3 wherein the gate means includes a field effect transistor of the junction type having its source and drain regions coupled between the output of the differential amplifier and the capacitor, and switched alternatively to its high or low impedance state under the control of said digital signals.

5. The combination set forth in claim 4 wherein the buffer means includes a field effect transistor of the junction type having a control gate coupled to the capacitor and having source and drain regions;

means operating the latter transistor in its source follower mode; and a resistor coupling the latter drain region to the input of said last operational amplifier.

6. In apparatus of the type in which an analog circuit includes at least one operational amplifier having an input, an output and an uninterrupted negative feedback means;

in which the amplifier is operated under the control of digital signals to execute compute cycles; and in which the amplifier output is uncompensated for drift and offset errors;

the combination with the amplifier of a source of reference voltage, the level of which is determined by previous operation of the apparatus;

input signal sources, means coupling signals from each input signal source to the amplifier both during and between compute cycles to amplify the signals from each source both during and between compute cycles, a compare circuit having inputs coupled to the amplifier output and to the reference voltage source and producing at its output a signal which varies as a function of the difference in voltage between the momentary values of the amplifier output voltage and the reference voltage, a reactive storage element, means controlled by digital signals between compute cycles for coupling the compare circuit output to the storage element to produce across the storage element a voltage which varies as a function of said compare circuit output signal, and said last-mentioned means controlled during each compute cycle to decouple the compare circuit output from the storage element to retain the voltage level across the storage element which exists at the beginning of the compute cycle; and buffer means having its input coupled to the storage element and its output coupled to the amplifier input and applying to the amplifier input between compute cycles a correction signal continuously maintaining the amplifier output voltage equal to the reference voltage as drift, offset and input signal errors vary and applying to the amplifier input during each compute cycle the correction signal which exists at the beginning of said cycle.

7. In apparatus of the type in which an analog circuit includes a plurality of cascade-connected operational amplifiers, each having an input, an output, and an uninterrupted negative feedback means;

in which the plurality of amplifiers is operated under the control of digital signals to execute compute cycles; and in which each amplifier output is uncompensated for drift and offset errors;

the combination with the last amplifier in the plurality of a source of reference voltage, the level of which is determined by previous operation of the apparatus;

input signal sources, means coupling signals from each input signal source to a respective amplifier both during and between compute cycles to amplify the signals from each source both during and between compute cycles, a compare circuit having inputs coupled to said last amplifier output and to the reference voltage source and producing at its output a signal which varies as a function of the difference in voltage between the momentary values of the last amplifier output voltage and the reference voltage, a reactive storage element, means controlled by digital signals between compute cycles for coupling the compare circuit output to the storage element to produce across the storage element a voltage which varies as a function of said compare circuit output signal, and said last-mentioned means controlled during each compute cycle to decouple the compare circuit output from the storage element to retain the voltage level across the storage element which exists at the beginning of the compute cycle; and buffer means having its input coupled to the storage element and its output coupled to the last amplifier input and applying to the last amplifier input between compute cycles a correction signal continuously maintaining the amplifier output voltage equal to the reference voltage as drift, offset and input signal errors vary and applying to the amplifier input during each compute cycle the correction signal which exists at the beginning of said cycle.

8. In apparatus of the type in which an analog circuit includes a plurality of cascade-connected operational amplifiers operated under the control of digital signals to execute compute cycles;

each amplifier being uncompensated for drift and offset errors, each having uninterrupted negative feedback means and said amplifiers coupling their output signals to succeeding ones thereof both during and between compute cycles;

the combination with the last amplifier of an error correction circuit means effective between compute cycles to apply a variable correction signal to an input to the last amplifier for maintaining its output at a preselected voltage level irrespective of the input signal levels to the last amplifier and irrespective of the last amplifier offset and drift errors, and effective during each compute cycle to apply said correction signal at the level which exists at the beginning of the compute cycle, said circuit means comprising:

input signal sources, means coupling signals from each of said sources to respective ones of said amplifiers both during and between compute cycles, a programmable source of reference voltage;

means including a differential amplifier continuously comparing the output voltage of said last operational amplifier with said reference voltage and producing an output signal which is a function of the difference between said output and reference voltages;

a storage capacitor;

a high input impedance amplifier having its input coupled to the capacitor and having an output;

a resistor coupling the output of the latter amplifier to the input of said last operational amplifier; and switch means adapted for connection with a source of controlling digital signals and operated between compute cycles to couple the output signal of the compare means to the capacitor to produce a charge in the capacitor which is a function of said difference between the last amplifier output voltage and the reference voltage and operated during each compute cycle to decouple the compare means from the capacitor to maintain the charge in the capacitor at the level which exists at the initiation of the compute cycle;

said compare means, high input impedance amplifier, capacitor, resistor and switch means being effective to apply to the input of the last operational amplifier a signal which maintains its output at the reference voltage between compute cycles.

References Cited

UNITED STATES PATENTS

| | | | |
|---|---|---|---|
| 2,768,247 | 1956 | Beard et al. | 330—9 |
| 3,070,786 | 1962 | MacIntyre | 330—9 |
| 3,140,408 | 1964 | May | 330—9 |
| 3,158,759 | 1964 | Jasper | 307—229 |
| 3,167,718 | 1/1965 | Davis et al. | 307—229 |
| 3,176,236 | 3/1965 | Abbott | 330—9 |
| 3,246,171 | 4/1966 | White | 307—229 |

JOHN S. HEYMAN, *Primary Examiner.*

H. A. DIXON, *Assistant Examiner.*

U.S. Cl. X.R.

330—28